No. 694,870. Patented Mar. 4, 1902.
C. W. LEVALLEY.
DRIVE CHAIN.
(Application filed Apr. 2, 1901.)
(No Model.) 2 Sheets—Sheet 1.
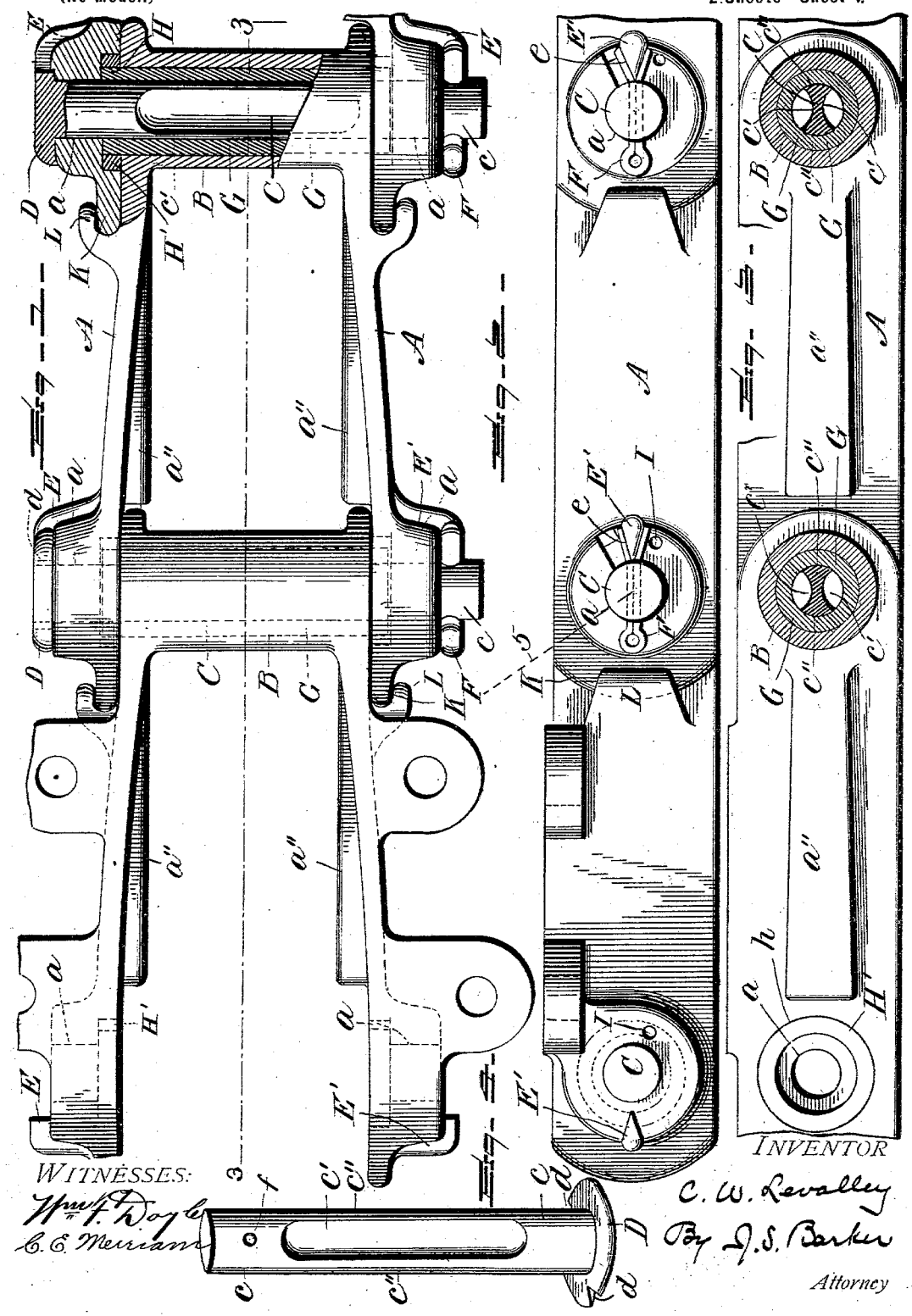
INVENTOR
C. W. Levalley
By J. S. Barker
Attorney
WITNESSES:
Wm. F. Doyle
C. E. Merriam

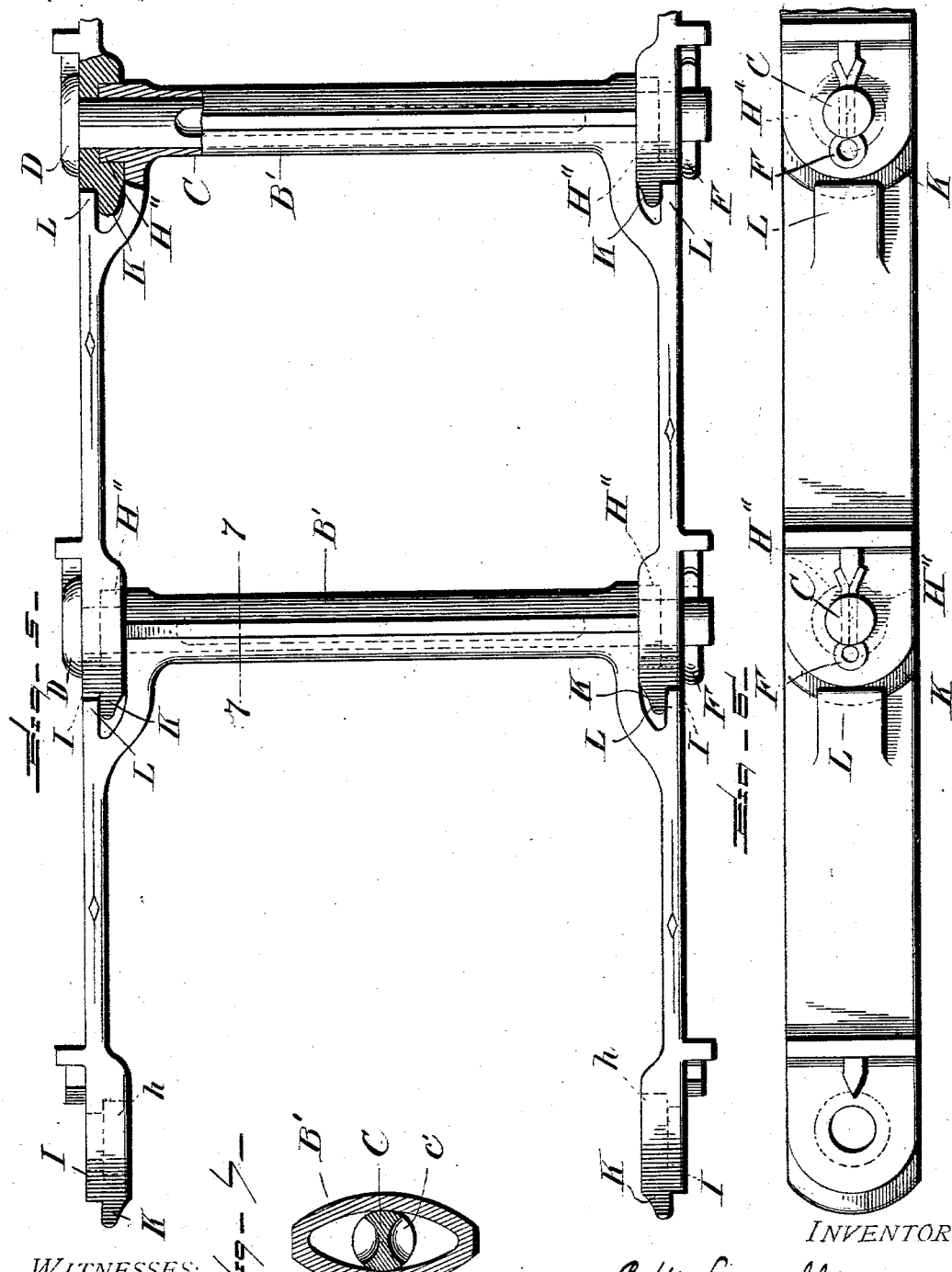

UNITED STATES PATENT OFFICE.

CHRISTOPHER W. LEVALLEY, OF MILWAUKEE, WISCONSIN.

DRIVE-CHAIN.

SPECIFICATION forming part of Letters Patent No. 694,870, dated March 4, 1902.

Application filed April 2, 1901. Serial No. 54,067. (No model.)

*To all whom it may concern:*

Be it known that I, CHRISTOPHER W. LE-VALLEY, a citizen of the United States, residing at Milwaukee, in the county of Milwaukee and State of Wisconsin, have invented new and useful Improvements in Drive-Chains, of which the following is a specification.

My present invention relates to drive or sprocket chains, and has for its object to improve the same in several respects and particularly with reference to the construction and arrangement of the articulating parts or joints of the links which constitute the chain and the means for coupling or uniting the parts and holding them in working relations.

In the accompanying drawings, Figure 1 represents a plan view of two chain-links of slightly-different construction to which my invention is applied, parts of the links at one of the joints being represented in horizontal section. Fig. 2 is an edge view of the links represented in Fig. 1. Fig. 3 is a longitudinal sectional view taken on the line 3 3 of Fig. 1. Fig. 4 is a detail perspective view of the connecting-pin. Fig. 5 is a plan view of a small section of a chain composed of links of different construction from those shown in the views heretofore described embodying certain features of my invention. Fig. 6 is an edge view of the same, and Fig. 7 is a vertical section taken on the line 7 7 of Fig. 5.

In the drawings, A A represent the side bars of the links, and B the connecting end bars. I have represented my invention as being applied to a chain in which the individual links are formed of two side bars and an end bar of integral construction, the end bar being tubular or hollow and adapted to have passed through it the coupling-pin C, which unites adjacent links at the joints or points of articulation of the chain. It will be understood, however, that certain features of my invention are applicable to chains of which the side bars and end bars are separate from each other instead of integral—as, for instance, in a chain constructed like that represented in my Patent No. 657,945 of September 18, 1900.

The outer or free ends of the side bars A are arranged to be coupled to the end bar B of an adjacent link, said side bars lying outside of or at the opposite ends of the said end bar, as is common in chains formed of links of this type. These outer ends of the side bars are perforated at $a$ to form close-fitting seats for the end portions $c$ of the connecting-bolts C. The portions of the connecting-bolt which are seated in and engage with the side bars are preferably cylindrical, as represented in Fig. 4. The intermediate or central portion of the connecting-bolt is cut away or reduced upon two of its opposite sides, as represented at $c'$ $c'$. The part of the bolt which is cut away or omitted is of such a shape as to leave between the cut-away or reduced portions two bearing-surfaces $c''$ $c''$, the peripheries of which are preferably concentric with the longitudinal axis of the bolt, and they constitute the wearing-surfaces of the bolt, which engage with the interior wearing-surfaces of the end bar B.

As will be seen by reference to Figs. 3 and 7, the form of connecting-bolt just described when in place leaves two cavities within the end bar, which I utilize as receptacles for a supply of lubricating material for the joint of the chain. It will be seen, particularly by reference to Fig. 1, that the cylindrical portions $c$ of the connecting-bolt closely fit the outer ends of the transverse aperture through the end bar of the link, as well as fitting closely the apertures in the side bars which are connected with the said end bar. This insures that there shall be little leakage of the lubricant held in the cavities formed by cutting away or reducing the connecting-bolt and also operates to prevent the entrance of dirt into the joint of the chain.

It is evident that the centers of the bearing-surfaces $c''$ should lie in the longitudinal plane of the chain, and I therefore provide means for holding the connecting-bar against rotation and in position to have its wearing-faces in proper working position.

D represents a head formed at one end of the bolt C. It is provided with diametrically opposed notches or recesses $d$, which are adapted to be engaged by a stop or lug E, formed on the side bar A of the chain-link. The position of the lug E and the notch or recess with which it engages is such that when these parts engage or interlock the bolt is held in the working position, which has already been described.

F represents a split key which is adapted to pass through an aperture $f$ in the bolt and which serves to retain the same against accidental removal. In order to prevent a split key from slipping from its seat, it is customary to slightly spread its ends, and I prefer to provide a lug E', having a beveled face $e$, for this purpose. This lug is so situated that when the key is driven through the aperture in the bolt the beveled or wedge-shaped face $e$ of the lug will serve to separate the ends of the key, as represented in Fig. 2, and thus lock it in place. This lug and key also cooperate to assist in holding the bolt C against rotation and would operate to maintain the bolt in proper working position should the lug or stop E, which engages with the head of the bolt, be broken or inoperative from any cause.

I prefer that the lugs or projections E and E', which are arranged upon the opposite side bars of a link, should occupy similar positions and be similarly constructed, so that either may engage with the head of the bolt or with the split key, according as the bolt enters the cross-bar from one side of the chain or the other.

It is evident that the strain upon one of the surfaces $c''$ will be greater than upon the other, being most upon the side which is away from the driving-wheel as the chain advances toward it, and that accordingly the connecting pin or bolt wears most rapidly upon this side. When this surface has so far worn as to cause the joint to become loose or otherwise impaired, the pin may be turned half around and secured in place with the opposite wearing-surface in position to receive the greater amount of wear.

In the form of my invention represented in Figs. 5 and 6 the wearing-surfaces $c''$ of the cross-bolt engage directly with the inner surfaces of the cavity extending through the end bar B'. I prefer, however, for some forms of chain, particularly where the chain in use is subject to great strain, to provide the end bars with removable wearing-sleeves G, of hardened steel, as represented in Figs. 1 and 3. This sleeve is fitted tightly into the cavity extending through the end bar B. The wear upon the sleeve is not uniform throughout its entire interior wearing-face, owing both to the cross-bolt which engages therewith being in part cut away and because strain upon the chain causes more wear upon one side of the pin than the other. It is therefore advantageous when the sleeve becomes worn to such an extent as to impair the working of the chain to uncouple the chain, remove the sleeve, and partially turn it, so as to present a new wearing-face, and then reinsert it. By this means the same sleeve can be turned one or more times and with each change the joint is practically as good as new. When the sleeve becomes so worn as to be no longer serviceable, it can be entirely discarded and a new one substituted in its place. Heretofore it has been necessary to discard the entire link when it became so worn at the joint as to be unserviceable; but by the use of the feature of my invention just described the life of the link can be prolonged indefinitely, it being only necessary to renew the wearing parts, such as the sleeve G and the cross-bolt C. It is evident that there is practically no wear upon the seats $a$ in the side bars, as the cross-bolts do not turn in such seats, being held against rotation by the lugs E E', as has been described.

It is desirable to relieve the cross-bolts C from strain to as large an extent as possible, and I have heretofore patented certain improvements whereby this result is largely obtained—as, for instance, by the means illustrated in my patent hereinbefore mentioned, in which the adjacent links are provided with interlocking annular flanges and recesses concentric with the axis of the cross-bolts and arranged in line with the side bars. These features, modified to suit the forms of chain shown, are embodied in my present invention. Thus in the form of chain shown in Figs. 5 and 6, H'' H'' represent hubs or bosses at the ends of the cross-bar B', and $h\ h$ are recesses in the outer or free ends of the side bars, into which the bosses H'' enter and with which they engage and articulate. In the form of invention shown in Fig. 1 the hub or boss H is formed by extending the sleeve G outward beyond the ends of the cross-bar B. The cavities or recesses $h$ in the free ends of the side bars are larger than the hubs or bosses H, and have fitted within them rings H', of hardened steel, with which the bosses H engage. As the rings H' become worn they may be removed and replaced by others. I prefer to perforate the side bars, as at I, adjacent to the recesses $h$, so that a tool may be used passing through such perforations for removing the wearing-rings H'.

K represents a flange at the forward or free end of each side bar, and L represents a lip or lug projecting outward from each side bar near its rear end. When the parts of the chain are in working position, the flange K lies behind or inside of the lip L, between it and the side bar, and is held thereby against spreading. In order to pass the flange in behind the lip L, the link is turned into the angular position represented by the dotted line 5 in Fig. 2.

The side bars of the links represented in Fig. 1 are provided upon their inner faces with tapering flanges or webs $a''$, in order to make the opening inclosed by the side and end bars approximately rectangular in shape. The link at the left-hand side of Fig. 1 is represented as being provided with lugs, to which may be attached cross-slats. These are shown for the purpose of indicating the fact that attachments of various kinds and for various purposes may be applied to chains embodying my present improvements without affecting or changing the invention.

The lugs E E' may be located in different positions relative to the apertures for the cross-bolt. Thus in Fig. 1 these projections are represented as being on the front side of the cross-bolt holes on one link and on the rear side of such holes in the other link.

It will be observed that the cross connecting-bolts when cut away or recessed, as hereinbefore described, are substantially of full size in the direction of the length of the chain, which is the direction in which the strain is applied to the bars, and that the cut-away or reduced parts are in a plane transverse thereto. The bolts can be thus very much reduced in weight and size, so that relatively large lubricant-receptacles may be formed, without materially weakening the bolts for the purpose for which they are used.

I have demonstrated that in chains such as herein illustrated and described and wherein the end bars of the links are provided with outward-extending hubs or projections which interlock with the side bars of the adjacent links and where the side bars are provided with keepers adapted to engage with the free ends of the adjacent links and prevent them from spreading the cross-connecting bolts or pins may be entirely dispensed with under certain conditions and satisfactory results be obtained.

Having described my invention, what I claim, and desire to secure by Letters Patent, is—

1. In a drive-chain the combination with links having side bars and end bars, of connecting-bolts, the end portions of which are shaped to closely fit the apertures in the side bars, and the ends of the apertures in the end bars, while the longitudinal central portions of the bolts are formed with separated concentric wearing-surfaces which engage with the end bars, substantially as set forth.

2. In a drive-chain the combination with links having side bars and end bars, of connecting-bolts for the links the outer portions of which are formed to closely fit the apertures in the side bars and the ends of the apertures in the end bars, while the longitudinal central portions of the bolts are formed with separated concentric wearing-surfaces with which the end bars of the links have articulate engagement, and means for holding the bolts against rotation with the said separated wearing-surfaces disposed in the longitudinal plane of the chain, substantially as set forth.

3. In a drive-chain, the combination with side bars and chambered end bars constituting links, of connecting-bolts passing through the side bars and the end bars, and uniting the links at the joints or points of articulation, the end portions of the bolts being cylindrical and the intermediate portions of the bolts which are within the end bars being cut away or reduced on two sides, whereby there are formed a plurality of lubricant-receptacles within each end bar, which receptacles are separated by relatively wide wearing-surfaces C'' C'' of the bolt, substantially as set forth.

4. The combination with the separate articulating links of a drive-chain, of the connecting-bolts for uniting the links, the bolts being formed with enlarged heads having recesses d, and lugs or projections E carried by the chain-links and arranged to engage with the recesses in the heads of the bolts when the latter are in position, whereby the bolts are held against rotation, substantially as set forth.

5. The combination with the adjacent links of a drive-chain, of a bolt for uniting them at their joint or point of articulation, a split key for holding the bolt in place, and a lug carried by one of the links for spreading the key to prevent its accidental displacement, substantially as set forth.

6. The combination with the side bars and an end bar of a drive-chain, of a connecting-bolt passing through said bars and uniting them, the central longitudinal portion of the said bolt, which passes through the end bar having separated wearing-surfaces, a removable wearing-sleeve with which the bolt engages mounted in the end bar, and means for holding the bolt against rotation in different working positions, substantially as set forth.

7. The combination with the side bars and end bar of a drive-chain, of a bolt passing through such bars and uniting them, and a wearing-sleeve carried by the end bar and extending beyond the ends thereof, the side bars being recessed on their inner faces concentric with the apertures through which the said bolt passes to receive the projecting ends of the said sleeve, substantially as set forth.

8. The combination of the side bars of a drive-chain perforated near their ends for the passage of a connecting-bolt and recessed on their inner faces around said perforations, wearing-rings seated in the said recesses in the side bars, an end bar provided at its ends with hubs or bosses adapted to engage with the said wearing-rings, and a connecting-bolt passing through the said side and end bars and uniting them, substantially as set forth.

9. The combination of the side bars of a drive-chain perforated near their ends for the passage of a connecting-bolt and recessed on their inner faces around said perforations, an end bar, a connecting-bolt passing through the side bars and the end bar and uniting them forming a joint, wearing-rings seated in the recesses formed in the inner faces of the side bars, and a wearing-sleeve seated in the end bar and having its ends projecting beyond the end bar forming hubs or bosses which are adapted to engage with the wearing-rings seated in the side bars, substantially as set forth.

10. In a chain, the combination of the side bars, the end bars formed with outward-extending hubs or projections at their ends arranged to interlock with the overlapping ends of the side bars, and keepers carried by the side bars and arranged to engage with the free ends of the side bars of adjoining links and prevent them from spreading, substantially as set forth.

11. In a chain formed of articulating links, the combination of side bars arranged to overlap at the joints or places of articulation of the chain, the end bars which unite the side bars in pairs at one end, interlocking projections arranged between the end bars and the overlapping free ends of adjacent side bars, and keepers carried by the side bars arranged to prevent the spreading of the free ends of the side bars, substantially as set forth.

12. In a chain formed of articulating links, the combination of the side bars adapted to overlap at their ends, hollow end bars uniting the side bars in pairs at one end, and removable wearing-pieces fitted into the said hollow end bars and projecting beyond the ends thereof to constitute wearing projections which are arranged to interlock with the overlapping ends of the side bars, and keepers carried by the side bars and arranged to engage with the free ends of the side bars of adjacent links to prevent them from spreading, substantially as set forth.

CHRISTOPHER W. LEVALLEY.

Witnesses:
WM. C. FRYE,
W. C. SARGENT.